(12) United States Patent
Kim et al.

(10) Patent No.: US 12,374,251 B2
(45) Date of Patent: Jul. 29, 2025

(54) STRETCHABLE DISPLAY PANEL DEVICE AND IMAGE CORRECTION METHOD THEREFOR

(71) Applicant: CENTER FOR ADVANCED META-MATERIALS, Daejeon (KR)

(72) Inventors: Jae Hyun Kim, Daejeon (KR); Bong Kyun Jang, Daejeon (KR); Kwang Seop Kim, Daejeon (KR); Hak Joo Lee, Daejeon (KR); Hyeon Don Kim, Daejeon (KR); Min Woo Kweun, Seoul (KR); Se Jeong Won, Daejeon (KR)

(73) Assignee: CENTER FOR ADVANCED META-MATERIALS, Daejeon (KR)

( * ) Notice: Subject to any disclaimer, the term of this patent is extended or adjusted under 35 U.S.C. 154(b) by 239 days.

(21) Appl. No.: 18/201,183

(22) Filed: May 24, 2023

(65) Prior Publication Data

US 2023/0316974 A1    Oct. 5, 2023

Related U.S. Application Data

(63) Continuation of application No. PCT/KR2021/017729, filed on Nov. 29, 2021.

(30) Foreign Application Priority Data

Nov. 30, 2020 (KR) .................. 10-2020-0164941

(51) Int. Cl.
   *G09G 3/00* (2006.01)
   *G01L 1/22* (2006.01)

(52) U.S. Cl.
   CPC .......... *G09G 3/035* (2020.08); *G01L 1/2262* (2013.01); *G09G 2320/02* (2013.01); *G09G 2340/0442* (2013.01)

(58) Field of Classification Search
   None
   See application file for complete search history.

(56) References Cited

U.S. PATENT DOCUMENTS

2012/0026496 A1*   2/2012   Silny ............... G01J 3/1256
                                                356/328
2013/0278486 A1*  10/2013   Duerksen ............ G09G 3/20
                                                 345/55

(Continued)

FOREIGN PATENT DOCUMENTS

KR   10-2014-0099128 A   8/2014
KR   10-2014-0132569 A   11/2014

(Continued)

OTHER PUBLICATIONS

International Search Report of PCT/KR2021/017729 mailed Mar. 31, 2022.

*Primary Examiner* — Anh-Tuan V Nguyen
(74) *Attorney, Agent, or Firm* — Revolution IP, PLLC

(57) ABSTRACT

Proposed are a stretchable display panel device capable of effectively correcting an image according to a strain ratio and a method of correcting the image. The stretchable display panel device includes a stretchable display panel, a measurement unit, and a correction unit. The measurement unit measures the strain ratio of the stretchable display panel. The correction unit corrects the image on the stretchable display panel on the basis of the strain ratio. The expandable and contractible display panel overall has a uniform strain ratio and has a negative effective Poisson's ratio. The strain ratio is a strain ratio in a first direction.

10 Claims, 8 Drawing Sheets

(56) References Cited

U.S. PATENT DOCUMENTS

| | | | |
|---|---|---|---|
| 2014/0218408 A1 | 8/2014 | Kwon et al. | |
| 2015/0027238 A1* | 1/2015 | Wulff | G01L 5/0076 |
| | | | 73/862.68 |
| 2016/0124536 A1 | 5/2016 | Hyun et al. | |
| 2016/0144091 A1* | 5/2016 | Breedon | H10N 30/886 |
| | | | 264/129 |
| 2016/0217551 A1 | 7/2016 | Kim et al. | |
| 2019/0302479 A1* | 10/2019 | Smyth | G02B 26/004 |
| 2020/0027940 A1* | 1/2020 | Wang | H10K 50/84 |
| 2021/0320269 A1* | 10/2021 | Yu | H10K 59/90 |
| 2024/0015904 A1* | 1/2024 | Choi | H04M 1/0268 |

FOREIGN PATENT DOCUMENTS

| | | |
|---|---|---|
| KR | 10-2016-0053358 A | 5/2016 |
| KR | 10-2016-0077704 A | 7/2016 |
| KR | 10-2016-0091121 A | 8/2016 |

\* cited by examiner (a)

(b)

(a)　　　(b)

(a)　　　(b)

(a)    (b)

STRETCHABLE DISPLAY PANEL DEVICE AND IMAGE CORRECTION METHOD THEREFOR

TECHNICAL FIELD

The present disclosure relates to a stretchable display panel device and a method of correcting an image on the stretchable display panel device and, more particularly, to a stretchable display panel device capable of effectively correcting an image according to a strain ratio and a method of correcting the image on the stretchable display panel device.

BACKGROUND ART

In recent years, technological advancements in the information age have led to rapid developments in the field of display devices capable of processing and displaying vast amounts of information. Correspondingly, various display devices have been developed and have gained popularity among customers.

Specific examples of the display devices include liquid crystal displays (LCDs), plasma display panels (PDPs), field emission displays (FEDs), electroluminescence displays (ELDs), and the like. These display devices feature thinned, lightweight designs that offer high performance and low power consumption. However, the utilization of a glass substrate to withstand high temperature occurring during the manufacturing process imposes limitations on achieving the desired thinness, lightweight design, and flexibility of these display devices. In order to address these limitations, stretchable display devices have rapidly gained popularity among customers in recent years. They are manufactured using flexible and stretchable materials, such as plastics, instead of non-flexible glass substrates used in the related art. As a result, even when bent or stretched, they maintain their display performance.

Typically, the Poisson's ratio of the stretchable display device ranges from 0.2 to 0.45. As a result, the stretchable display device, when expanding in one direction, contracts in a direction perpendicular to the one direction, and thus an image is distorted.

That is, the stretchable display device, when having a positive Poisson's ratio, exhibits the behavior of contracting in the direction perpendicular to the expanding direction. Thus, the image is displayed on the stretchable display device based on the smaller of the changed sizes of the stretchable display device. As a result, a problem arises when the image is displayed based on the contracted size of the stretchable display device, leading to distorted or inaccurate representation. That is, a problem arises when the stretchable display device is stretched, resulting in a decrease in the size of the display image.

In a case where the stretchable display device has a positive Poisson's ratio, a transverse axis and a longitudinal axis of a screen are externally required to be stretched at the same time (stretching along two axes). However, the problem is that a display frame has to be configured in a complex manner in order to realize the stretching along two axes.

DISCLOSURE

Technical Problem

An object of the present disclosure, which is made to solve the above-mentioned problems, is to provide a stretchable display panel device capable of effectively correcting an image according to a strain ratio and a method of correcting an image on the stretchable display panel device.

The present disclosure is not limited to the above-mentioned object. From the following description, an object of the present disclosure that is not mentioned above would be apparently understandable by a person of ordinary skill in the art to which the present disclosure pertains.

Technical Solution

In order to accomplish the above-mentioned object, according to an aspect of the present disclosure, there is provided a stretchable display panel device including: a stretchable display panel unit; a measurement unit configured to measure a strain ratio of the stretchable display panel unit; and a correction unit configured to correct an image on the stretchable display panel unit on the basis of the strain ratio, wherein the stretchable display panel unit overall has a uniform strain ratio and has a negative effective Poisson's ratio, and wherein the strain ratio is a strain ratio in a first direction.

In the stretchable display panel device, the correction unit may correct the image on the basis of the measured strain ratio in the first direction and the effective Poisson's ratio.

In the stretchable display panel device, in a case where a pixel number (I, J) of the stretchable display panel unit before stretched corresponds to a pixel number (i, j) after stretched and where the effective Poisson's ratio Nu satisfies the condition $-1 \leq Nu < 0$, the correction unit may compute the pixel number (i, j) using Equation 3.

$$i=\text{Conversion for Integer Representation}\{1\times((1-(S-1)Nu)/S)\}, j=J \quad \text{Equation 3:}$$

where S depicts a stretchability ratio in the first direction

In the stretchable display panel device, in a case where a pixel number (I, J) of the stretchable display panel unit before stretched corresponds to a pixel number (i, j) after stretched, and where the effective Poisson's ratio Nu is $Nu<-1$, the correction unit may compute the pixel number (i, j) using Equation 4.

$$i=I, j=\text{Conversion for Integer Representation}\{J\times(S/(1-(S-1)Nu))\} \quad \text{Equation 4:}$$

where S depicts a stretchability ratio in the first direction.

In order to accomplish the above-mentioned object, according to another aspect of the present disclosure, there is provided a stretchable display panel device including: a stretchable display panel unit; a measurement unit configured to measure a strain ratio of the stretchable display panel unit; and a correction unit configured to correct an image on the stretchable display panel unit on the basis of the strain ratio, wherein the stretchable display panel unit is partitioned into a plurality of regions according to the strain ratio thereof and has a negative effective Poisson's ratio, and wherein the measurement unit measures the strain ratio in a first direction of the stretchable display panel for each of the regions.

In the stretchable display panel device, an image may be corrected on the basis of the measured strain ratio in the first direction and the effective Poisson's ratio for each of the regions.

In the stretchable display panel device, the measurement unit may include: a strain-ratio sensor; and a Wheatstone bridge circuit configured to amplify a signal of the strain-ratio sensor.

In the stretchable display panel device, the measurement unit may include a digital image correlation (DIC) sensor.

In the stretchable display panel device, the measurement unit may include an electromagnetic meta-sensor.

In order to accomplish the above-mentioned object, according to another aspect of the present disclosure, there is provided a method of correcting an image on a stretchable display panel device, the method including a strain-ratio step of measuring a strain ratio in a first direction of a stretchable display panel unit that, overall, has a uniform strain ratio and has a negative effective Poisson's ratio; and an image correction step of correcting an image on the basis of the measured strain ratio in the first direction and the effective Poisson's ratio.

In order to accomplish the above-mentioned object, according to still another aspect of the present disclosure, there is provided a method of correcting an image on a stretchable display panel device, the method including: a strain-ratio measurement step of measuring a strain ratio in a first direction of the stretchable display panel unit that is partitioned into a plurality of regions according to the strain ratio thereof and has a negative effective Poisson's ratio, for each of the regions; and an image correction step of correcting an image on the basis of the measured strain ratio in the first direction and the effective Poisson's ratio.

Advantageous Effects

According to an embodiment of the present disclosure, because it has a negative effective Poisson's ratio, a stretchable display panel unit can exhibit the behavior of expanding in one direction and, at the same time, expanding a direction perpendicular to the one direction, that is, the behavior that contributes to realizing the stretchable display panel.

In addition, according to the embodiment of the present disclosure, an image that is not distorted can be displayed by performing correction on the basis of the strain ratio of the stretchable display panel unit and the effective Poisson's ratio when the stretchable display panel unit expands.

The present disclosure is not limited to the above-mentioned effects. An effect not mentioned above would be deduced from the detailed description and the constituent elements recited in the claims.

MODE FOR INVENTION

Figure 1:
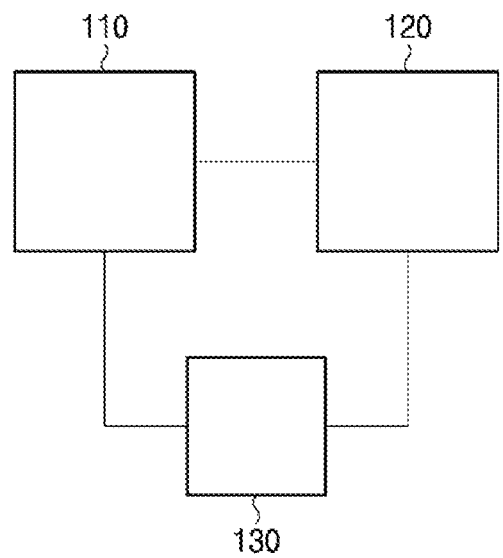
FIG. 1 is a view illustrating a configuration of a stretchable display panel device according to a first embodiment of the present disclosure.

Embodiments of the present disclosure will be described below with reference to the accompanying drawings. However, the present disclosure may be implemented in various different forms and therefore is not limited to the embodiments thereof that are described below. In order to definitely describe the embodiments of the present disclosure, a constituent element not associated with the description is omitted from the drawings, and the same constituent elements are given the same reference numeral throughout the present specification.

Throughout the specification, a constituent element, when described as being "connected to" (coupled to, brought into contact with, or combined with) one other constituent element, may be directly connected to that constituent, or may be "indirectly connected to" that constituent element with a third constituent element in between. Unless otherwise specified, the expression "includes a certain constituent element" means that any other constituent element may further be included, not that any other constituent element is excluded.

Terms used throughout the present specification are only for describing a specific embodiment and are not intended to impose any limitation on the present invention. A noun in singular form has the same meaning as when used in plural form, unless it has a different meaning in context. The terms such as "include," "have," and the like in the present application should be understood that they are each intended to indicate the presence of a feature, a number, a step, an operation, a constituent element, or a component described in the present specification, or a combination of these. However, they do not preclude the possibility of additional features, numbers, steps, operations, constituent elements, components described in the present specification, or combinations of these.

The embodiments of the present disclosure will be described in detail below with reference to the accompanying drawings.

FIG. 1 is a view illustrating a configuration of a stretchable display panel device according to a first embodiment of the present disclosure.

As illustrated in FIG. 1, the stretchable display panel device may include a stretchable display panel unit 110, a measurement unit 120, and a correction unit 130.

The stretchable display panel unit 110 is stretchable in a first direction D1 and a second direction D2.

Typically, the Poisson's ratio is a ratio between transverse and longitudinal strains of a material and is defined as following Equation 1.

$$v = -(\varepsilon x / \varepsilon y) \qquad \text{Equation 1}$$

where v depicts the Poisson's ratio, εx depicts an X-axis strain ratio, and εy depicts a Y-axis strain ratio.

Usually, a material, when expanding in the X-axis direction, contracts in the Y-axis direction perpendicular to the X-axis direction. Thus, the Poisson's ratio has a positive (+) value. The Poisson's ratios of all materials are smaller than 0.5, and the Poisson's ratio of a metal material is approximately 0.3.

In contrast, according to the present disclosure, an effective Poisson's ratio applies. The effective Poisson's ratio may have a negative (−) value.

Figure 2:
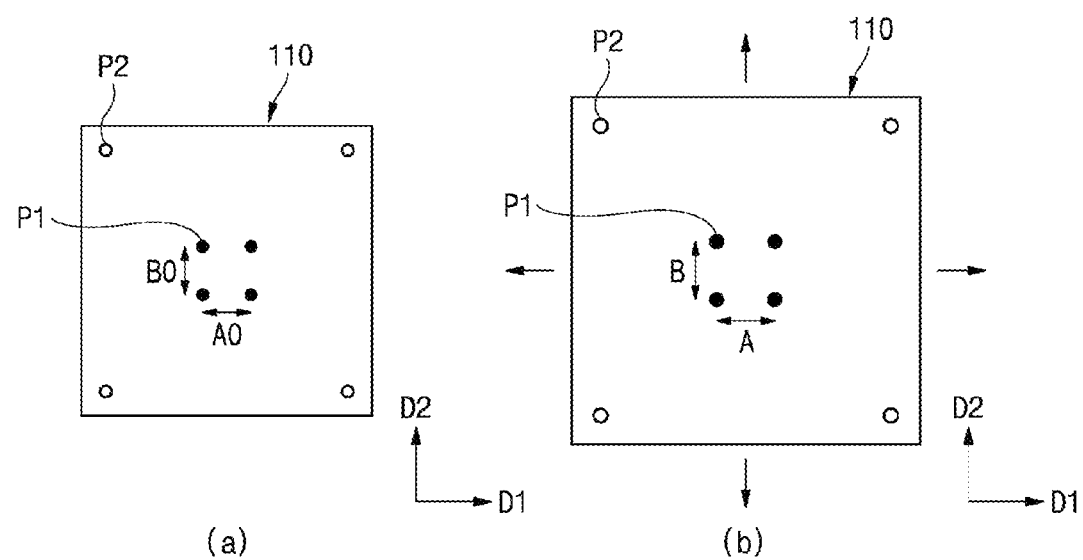
FIG. 2 is a view that is referred to for description of an effective Poisson's ratio according to the present disclosure.

FIG. 2 is a view that is referred to for description of the effective Poisson's ratio according to the present disclosure and that is included in figures that are hereinafter referred to for description.

The fact that the effective Poisson's ratio is negative may indicate that the Poisson's ratio of a material itself of which a display panel is formed is not negative, but that the Poisson's ratio measured on average by a specific region of the display panel is negative. A structure that has a negative Poisson's ratio, although expanding in one direction, may exhibit the behavior of expanding together instead of contracting in a direction perpendicular to the one direction.

That is, as illustrated in FIG. 2(a), distances by which four points P1 on the stretchable display panel unit 110 in an initial non-stretched state are spaced apart in the first direction D1 and the second direction D2, respectively, are defined as A0 and B0, respectively. Then, as illustrated in FIG. 2(b), the stretchable display panel unit 110 according to the present disclosure, when expanding in the first direction D1, may also expand in the second direction D2 at the same time.

Distances by which a first reference point P1 is moved in the first direction D1 and the second direction D2, respectively, in a state where the stretchable display panel unit 110 expands, are defined as A and B, respectively. Then, the effective Poisson's ratio may be expressed as following Equation 2.

$$Nu = -((B-B0)/B0)/((A-A0)/A0) \qquad \text{Equation 2}$$

where Nu depicts the effective Poisson's ratio, ((A−A0)/A0) depicts a strain ratio in the first direction D1, and ((B−B0)/B0) depicts a strain ratio in the second direction D2. Because the strain ratio in the first direction D1 and the strain ratio in the second direction D2 are positive, the effective Poisson's ratio may have a negative (−) value. Although computed using a second reference point P2, the effective Poisson's ratio may have the same result as when using the reference point P1.

According to the present embodiment, in the stretchable display panel unit 110, the display panel overall have a uniform strain ratio. At this point, the fact that the strain is uniform indicates that the strain ratio may vary according to the degree to which the display panel is stretched, but that the strain ratio of the display panel is overall uniform. In other words, the fact that the strain ratio is uniform indicates that, when the stretchable display panel unit 110 is caused to expand by applying different forces, the strain ratio may vary according to the force that is applied, but that the stretchable display panel unit 110 overall has a uniform strain ratio when the force is applied. In a case where the display panel overall has a uniform strain ratio in this manner, the effective Poisson's ratio may have a constant regardless of the strain ratio, or the effective Poisson's ratio may be a function of the strain ratio.

Figure 3:
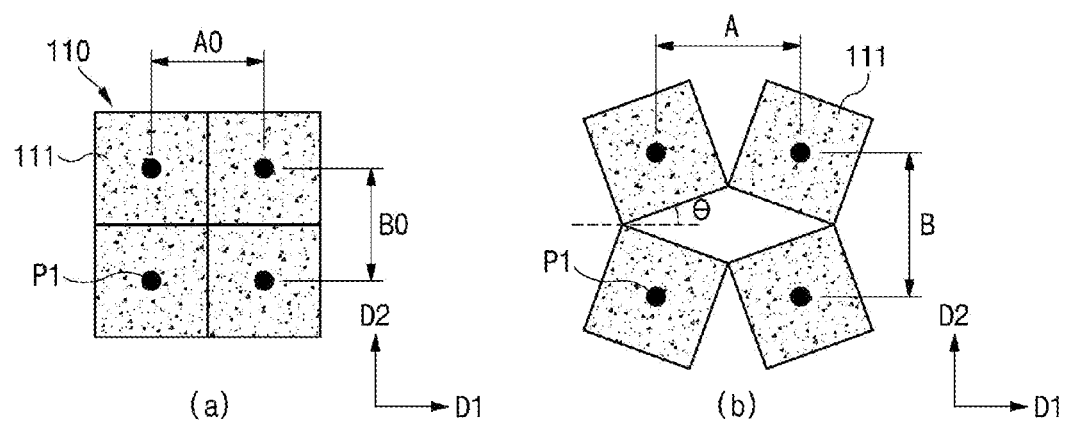
FIG. 3 is a view illustrating an example of a stretchable display panel unit of the stretchable display panel device according to the first embodiment of the present disclosure.

FIG. 3 is a view illustrating an example of the stretchable display panel unit 110 of the stretchable display panel device according to the first embodiment of the present disclosure.

As illustrated in FIG. 3, in a case where the stretchable display panel unit 110 has square pixels 111 and adjacent pixels 111 are hinge-rotated, a stretchability ratio may be expressed as A/A0=sin θ+cos θ. Accordingly, Nu=−((B−B0)/B0)/((A−A0)/A0)=−1. That is, the effective Poisson's ratio is −1.

In the above equation, A0 depicts the distance between the first reference point P1 and the adjacent point P1 in the first direction D1 in the initial state, B0 is the distance between the first reference point P1 and the adjacent point P1 in the second direction D2 in the initial state, A is the distance by which the first reference point P1 is moved in the first direction D1 in the expanding state, and B is the distance by which the first reference point P1 is moved in the second direction D2 in the expanding state. That is, the Poisson's ratio of the stretchable display panel unit 110 that has a shape illustrated in FIG. 3 may be a constant regardless of the strain ratio.

Figure 4:
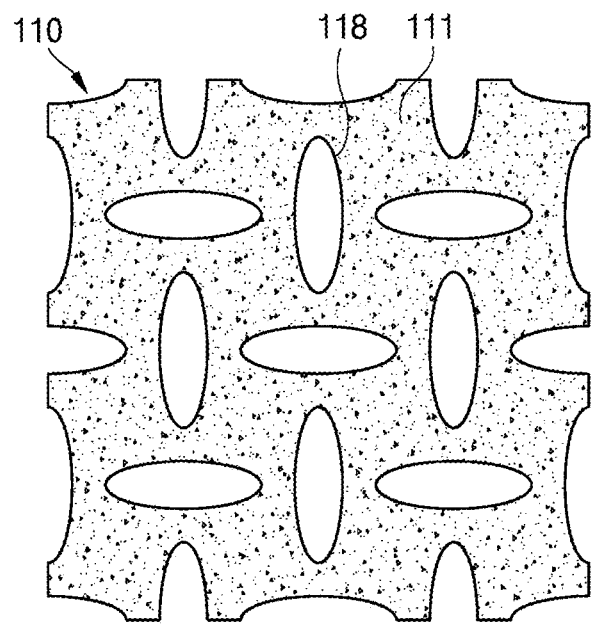
FIG. 4 is a view illustrating another example of the stretchable display panel unit of the stretchable display panel device according to the first embodiment according to the present disclosure.
Figure 4:
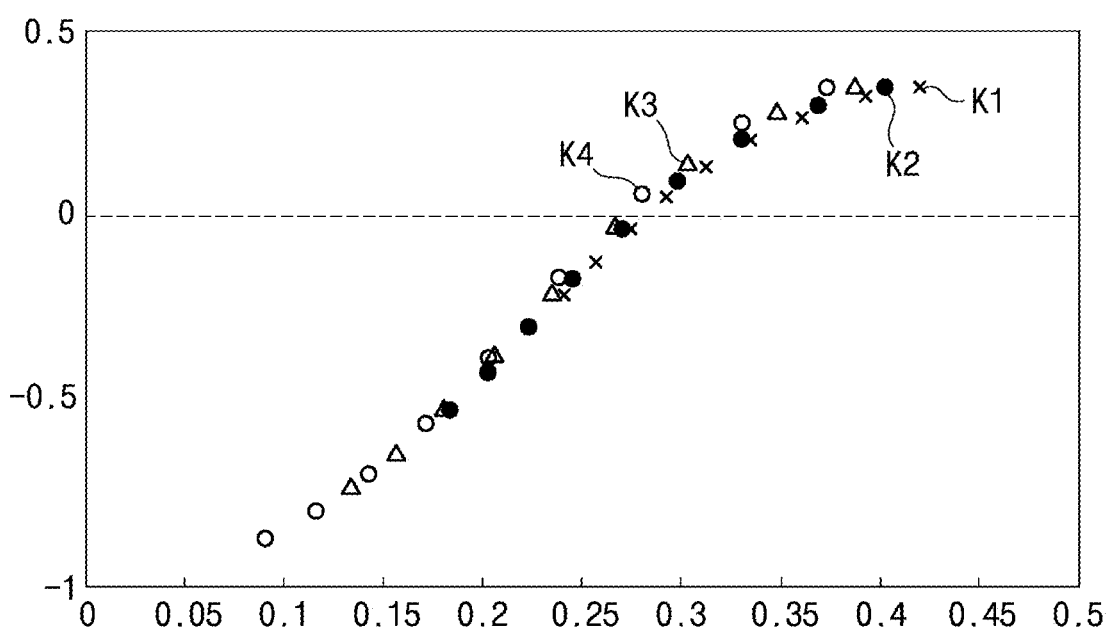

FIG. 4 is a view illustrating another example of the stretchable display panel unit 110 of the stretchable display panel device according to the first embodiment according to the present disclosure. As illustrated in FIG. 4(a), in a case where the stretchable display panel unit 110 has the pixels 111 that are distinguished along cutting lines 118, the effective Poisson's ratio (on the longitudinal axis of a graph), as illustrated in FIG. 4(b) may vary according to the magnitude of the strain ratio (on the transverse axis). With reference to FIG. 4(b), the effective Poisson's ratio changes from a negative number through 0 (zero) to a positive number. K1 to K4 indicate porosities of 2%, 3%, 4%, and 5%, respectively, formed by the cutting lines 118. From FIG. 4(b), it can be seen that the effective Poisson's ratio is not greatly influenced by the porosity to which holes formed by the cutting lines 118 contribute. Accordingly, it can be seen that the effective Poisson's ratio of the stretchable display panel unit 110 that has the shape illustrated in FIG. 4 is a function of the strain ratio (FIG. 4 is cited from Taylor et al., Adv.Mater (2013)).

The measurement unit 120 may measure the strain ratio of the stretchable display panel unit 110. The strain ratio here may be a strain ratio in the first direction D1. As described above, the stretchable display panel unit 110 overall has a uniform strain ratio. As a result, when a strain ratio in one direction is measured, a strain ratio in the direction perpendicular to the one direction may also be computed. The measurement unit 120 may be implemented in various forms.

Figure 5:
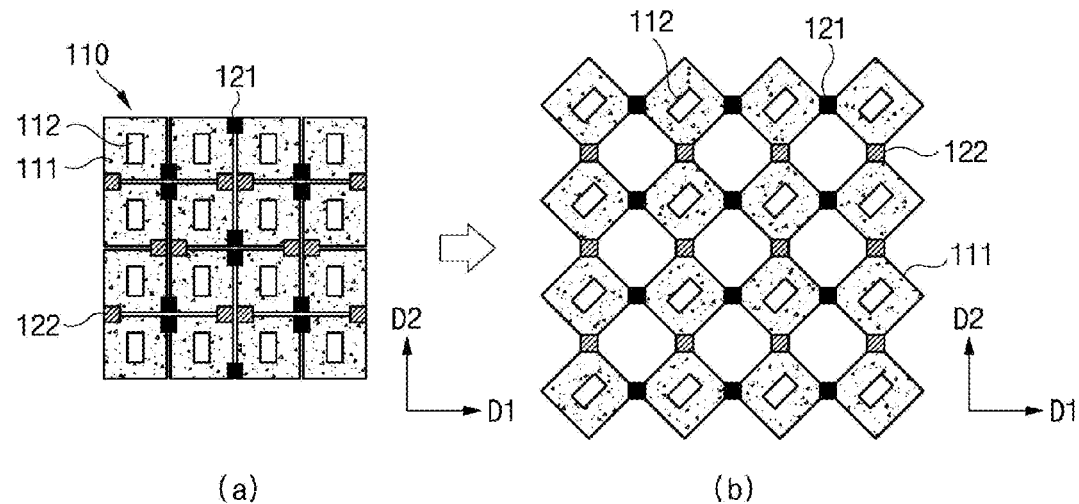
FIG. 5 is a view illustrating an example of a measurement unit of the stretchable display panel device according to the first embodiment of the present disclosure.

FIG. 5 is a view illustrating an example of the measurement unit of the stretchable display panel device according to the first embodiment of the present disclosure.

As illustrated in FIG. 5, the measurement unit 120 may include a strain-ratio sensor and a Wheatstone bridge circuit that amplifies a signal of the strain-ratio sensor. The strain-ratio sensor may be provided on a hinge portion between each of the pixels 111 of the stretchable display panel unit 110. An element 112 may be mounted on each pixel 111. The strain-ratio sensor may include a first strain-ratio sensor 121 for measuring the strain ratio in the first direction D1 and a second strain-ratio sensor 122 for measuring the strain ratio in the second direction D2. The strain-ratio sensor may be provided on a surface, on which the element 112 is mounted, of the pixel 111 and may be provided on a surface that is opposite to the surface, on which the element 112 is mounted, of the pixel 111.

The Wheatstone bridge circuit, along with the strain-ratio sensor, may also be provided on the hinge portion between each of the pixels 111. However, it is desired that the Wheatstone bridge circuit is provided on each pixel 111 where a strain does not occur. The strain-ratio sensor and the Wheatstone bridge circuit may be configured in a widely known manner.

Figure 6:
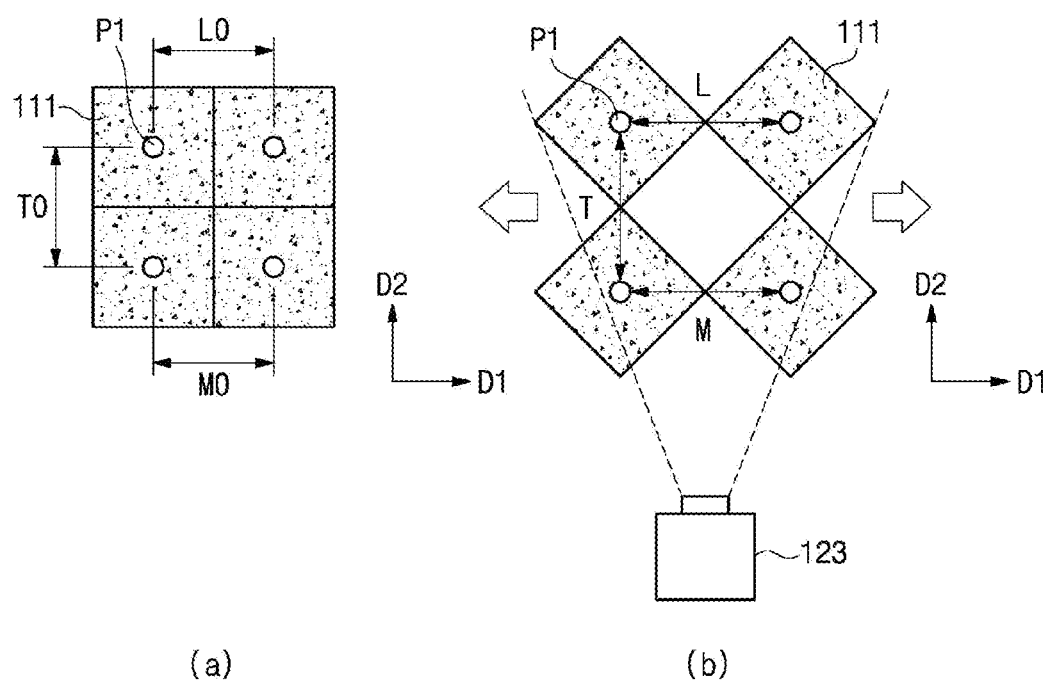
FIG. 6 is a view illustrating another example of the measurement unit of the stretchable display panel device according to the first embodiment of the present disclosure.

FIG. 6 is a view illustrating another example of the measurement unit of the stretchable display panel device according to the first embodiment of the present disclosure.

As illustrated in FIG. 6, the measurement unit 120 may include a digital image correlation (DIC) sensor. The DIC sensor may include a camera 123 that performs image-capturing for measuring a distance between each of the reference points P1 formed on each pixel 111.

Among the four reference points P1 on the stretchable display panel unit 110 in the non-stretched state, a distance by which two reference points P1 positioned above are spaced apart in the first direction D1 is defined L0, a distance by which two reference points P1 positioned below are spaced apart in the first direction D1 is defined as MO, and a distance by which the reference point P1 positioned above and the reference point P1 positioned below are spaced apart in the second direction D2 is defined T0. Then, as illustrated in FIG. 6(b), the camera 123 performs the image capturing for measuring distances L, M, and T that result when the stretchable display panel unit 110 expands. Then, the distances L, M, and T may be computed. Accordingly, the strain ratio may be computed.

Figure 7:
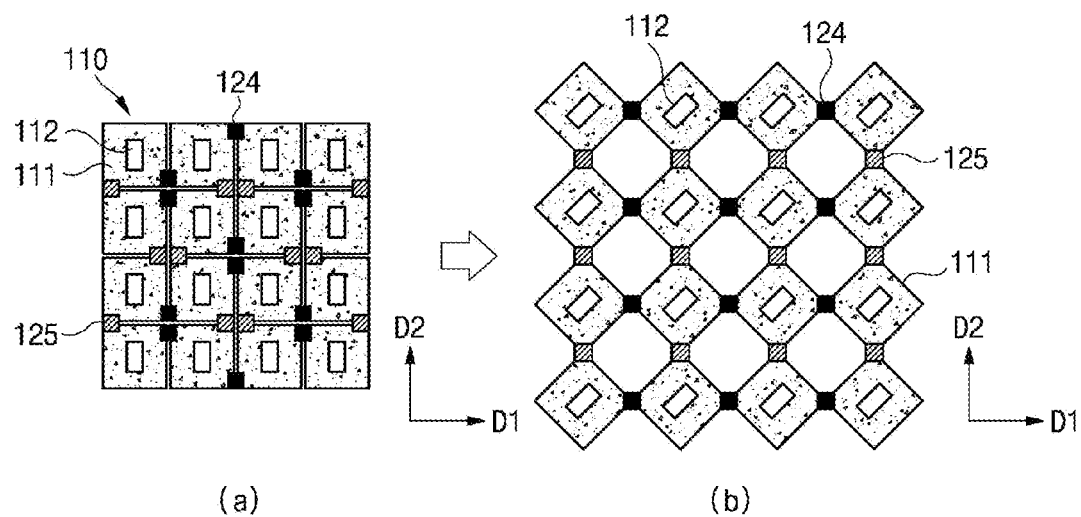
FIG. 7 is a view illustrating still another example of the measurement unit of the stretchable display panel device according to the first embodiment of the present disclosure.

FIG. 7 is a view illustrating still another example of the measurement unit of the stretchable display panel device according to the first embodiment.

As illustrated in FIG. 7, the measurement unit 120 may include an electromagnetic meta-sensor. The electromagnetic meta-sensor may be provided on the hinge portion between each of the pixels 111 of the stretchable display panel unit 110. The electromagnetic meta-sensor may include a first electromagnetic meta-sensor 124 for measuring the strain ratio in the first direction D1 and a second electromagnetic meta-sensor 125 for measuring the strain ratio in the second direction D2. The electromagnetic meta-sensor may include an infrared meta-structure that has emissivity, varying with an in-plane rotational angle, for a polarized infrared ray.

A rotational angle in the first direction of the first electromagnetic meta-sensor 124 may be measured with an infrared-ray camera using an infrared ray polarized in the first direction D1. A rotational angle in the second direction of the second electromagnetic meta-sensor 125 may be measured with the infrared-ray camera using an infrared ray polarized in the second direction D2. Displacements of the first electromagnetic meta-sensor 124 and the second electromagnetic meta-sensor 125 may be computed using a geometric associative equation, on the basis of the rotational angle in the first direction D1 and the rotational angle in the second direction. Thus, the strain ratio may be computed. The electromagnetic meta-sensor may be provided on a surface, on which the element 112 is mounted, of the pixel 111 or may be provided on a surface that is opposite to the surface, on which the element 112 is mounted, of the pixel 111.

The correction unit 130 may correct an image on the stretchable display panel unit 110 on the basis of the strain ratio measured by the measurement unit 120. The correction unit 130 may correct the image on the basis of the measured strain ratio in the first direction and the effective Poisson's ratio.

As described above, the effective Poisson's ratio may be computed on the basis of lengths of the stretchable display panel unit 110 that result before and after expansion and contraction. At this point, the effective Poisson's ratio Nu may satisfy −1≤Nu<0 or Nu<−1.

A method of correcting an image on the stretchable display panel device in a case where the effective Poisson's ratio satisfies the condition −1≤Nu<0 or Nu<−1 is described below. First, the method of correcting an image on the stretchable display panel device in the case where the effective Poisson's ratio satisfies the condition −1≤Nu <0 is described.

Figure 8:
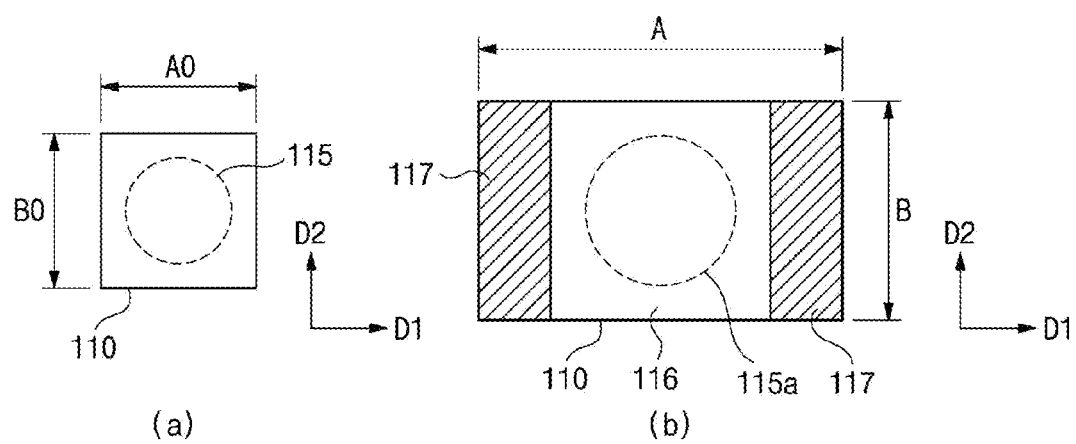
FIG. 8 is a view that is referred to for description of an example of a method of correcting an image on the stretchable display panel device according to the first embodiment of the present disclosure.

FIG. 8 is a view that is referred to for description of an example of the method of correcting an image on the stretchable display panel device according to the first embodiment of the present disclosure.

From FIG. 8, it can be seen that lengths in the first direction D1 and the second direction of the stretchable display panel unit 110 in the non-stretched state are A0 and B0, respectively, and that lengths in the first direction D1 and the second direction D2 of the stretchable display panel unit 110 after stretched are A and B, respectively. Accordingly, the effective Poisson's ratio Nu may be computed. In a case where the strain ratio in the first direction D1 is higher than the strain ratio in the second direction, it may be that −1≤Nu<0.

In a case where −1≤Nu<0, as illustrated in FIG. 8(b), the stretchable display panel unit 110 may expand in a manner that extends in the first direction D1. An image 115 before stretched has to be displayed as an image 115a that is not distorted after stretched. Accordingly, it is desired that the image 115a that increases in size in the first direction D1 and the second direction D2 at the same ratio is displayed on a first region 116. That is, the image 115 may be corrected on the basis of the second direction D2 in which the stretchable display panel unit 110 expands to a lesser extent.

As illustrated in FIG. 8(a), it is defined that RGB information at a position (I, J) of the pixel 111 before the stretchable display panel unit 110 is stretched is $P_{I,J}$, that a reference point (I, J)=(0,0), that $0≤I≤I_{max}$, and that $≤J≤J_{max}$. As illustrated in FIG. 8(b), it is defined that RGB information at a position (i, j) of the pixel 111 after the stretchable display panel unit 110 is stretched is Qu and that a reference point (i, j)=(0,0). Then, i may be converted into an integer according to following Equation 3, using a stretchability ratio S in the first direction and the effective Poisson's ratio Nu.

$$i = \text{Conversion for Integer Representation}\{I \times ((1-(S-1)Nu)/S)\} \qquad \text{Equation 3}$$

In Equation 3, S depicts a stretchability ratio (A/A0), and "conversion for integer representation" means that a decimal or fractional number is rounded up or down to the nearest integer. Coordinates for a position of the pixel 111 or the number of the pixel 111 may be an integer. Accordingly, by performing "conversion for inter representation," coordinates for a position of the pixel or the number of the pixel after stretched may also be obtained as an integer.

Then, it is defined that j=J, and the RGB information Pu before stretched applies to the RGB information $Q_{ij}$ after stretched. Thus, the position (i, j) of the pixel 111 after stretched may be obtained. Accordingly, when the display panel is stretched, proper RGB information may be provided to the pixel 111 of the stretched display panel.

In a case where Nu=−1, the RGB information before stretched also applies in the same manner after stretched.

In a case where conversion for integer representation $\{I_{max} \times ((1-(S-1)Nu)/S)\} < i < I_{max}$, a second region 117 that is a surplus region may be present in a left-side portion and a right-side portion of the stretchable display panel unit 110. The second region 117 may have the RGB information $P_{ij}$. The RGB information $P_{ij}$ may be utilized in displaying a dark-colored image or additionally displaying weather information or the like. The center point or any other point on the display panel may be designated as the reference point P1. The second region 117 may be formed only on one side of the stretchable display panel unit 110, as opposed to being illustrated.

Next, the method of correcting an image on the stretchable display panel device in the case where Nu<−1 is described.

Figure 9:
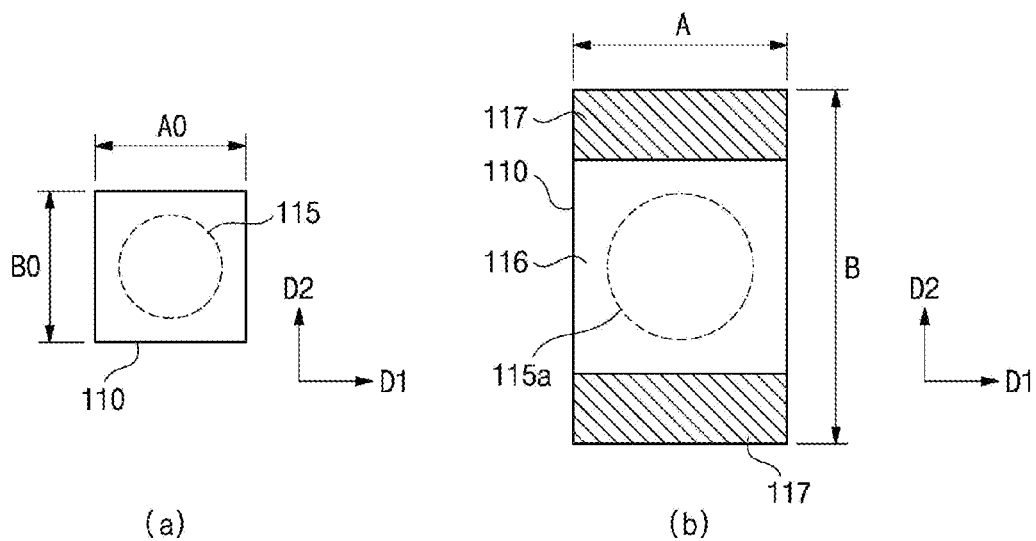
FIG. 9 is a view that is referred to for description of another example of the method of correcting an image on the stretchable display panel device according to the first embodiment of the present disclosure.

FIG. 9 is a view that is referred to for description of another example of the method of correcting an image on the stretchable display panel device according to the first embodiment of the present disclosure.

From FIG. 9, it can be seen that lengths in the first direction D1 and the second direction of the stretchable display panel unit 110 in the not-stretched state are A0 and B0, respectively, and that lengths in the first direction D1 and the second direction of the stretchable display panel unit 110 after stretched are A and B, respectively. Accordingly, the effective Poisson's ratio Nu may be computed. In a case where the strain ratio in the second direction D2 is higher than the strain ratio in the first direction D1, it may be that Nu<−1.

In a case where Nu<−1, as illustrated in FIG. 9(b), the stretchable display panel 110 may expand in a manner that extends in the second direction D2. The image 115 before stretched may increase in size in the first direction D1 and the second direction D2 at the same ratio, and thus may be displayed, as the image 115a that is not distorted even after stretched, on the first region 116. That is, the image 115 may be corrected on the basis of the first direction D1 in which the stretchable display panel unit 110 expands to a lesser extent.

As illustrated in FIG. 9(a), it is defined that the RGB information at the position (I, J) of the pixel 111 before the stretchable display panel unit 110 is stretched is Pu, that the reference point (I, J)=(0,0), that $0 \leq I \leq I_{max}$, and that $\leq J \leq J_{max}$. As illustrated in FIG. 9(b), it is defined that the RGB information at the position (i, j) of the pixel 111 after the stretchable display panel unit 110 is stretched is Qu and that the reference point (i, j)=(0,0). Then, j may be converted into an integer according to following Equation 4, using the stretchability ratio S in the first direction and the effective Poisson's ratio Nu.

$$j = \text{Conversion for Integer Representation}\{J \times (S/(1-(S-1)Nu))\} \quad \text{Equation 4}$$

The RGB information Pu before stretched applies to the RGB information $Q_{ij}$ after stretched. Thus, the position (i, j) of the pixel 111 after stretched may be obtained.

In a case where conversion for integer representation $\{J_{max} \times (S/(1-(S-1)Nu))\} < j < J_{max}$, the second region 117 that is a surplus region may be present in an upper portion and a lower portion of the stretchable display panel unit 110. The second region 117 may have the RGB information $P_{ij}$. The RGB information $P_{ij}$ may be utilized in displaying a dark-colored image or additionally displaying the weather information or the like. The center point or any other point on the display panel may be designated as the reference point P1. The second region 117 may be formed only on one side of the stretchable display panel unit 110, as opposed to being illustrated.

Figure 10:
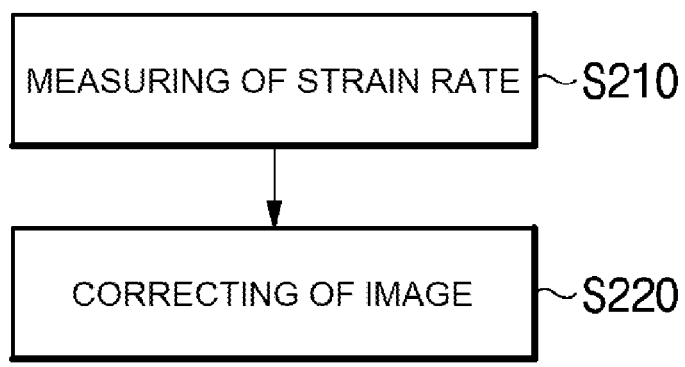
FIG. 10 is a flowchart illustrating the method of correcting an image on the stretchable display panel device according to the first embodiment of the present disclosure.

FIG. 10 is a flowchart illustrating the method of correcting an image on the stretchable display panel device according to the first embodiment of the present disclosure.

As illustrated in FIG. 10, the method of correcting an image on the stretchable display panel device may include a step S210 of measuring the strain ratio and a step S220 of correcting the image.

The step S210 of measuring the strain ratio may be a step of measuring the strain ratio in the first direction D1 of the stretchable display panel unit 110 that, overall, has a uniform strain ratio and that has a negative effective Poisson's ratio.

The step S220 of correcting the image may be a step of correcting the image on the basis of the measured strain ratio in the first direction D1 and the effective Poisson's ratio.

Figure 11:
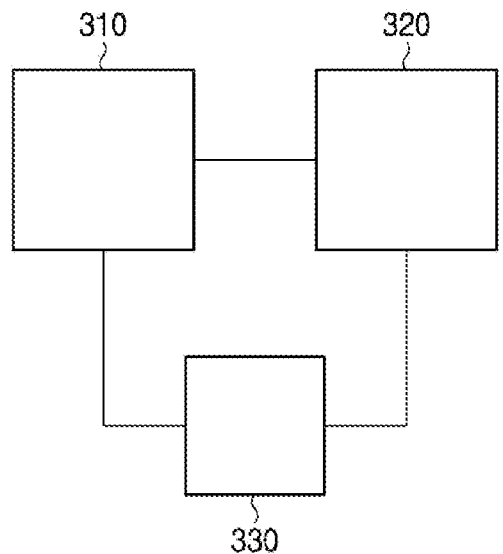
FIG. 11 is a view illustrating a configuration of a stretchable display panel device according to a second embodiment of the present disclosure.

FIG. 11 is a view illustrating a configuration of a stretchable display panel device according to a second embodiment of the present disclosure. A stretchable display panel unit 310 of the stretchable display panel device according to the present embodiment has a different strain-ratio characteristic than the stretchable display panel unit 110 of the stretchable display panel device according to the first embodiment. Accordingly, a measurement unit 320 and a correction unit 330 of the stretchable display panel device according to the present embodiment may have different characteristics than the measurement unit 120 and the correction unit 130 of the stretchable display panel device according to the first embodiment.

Specifically, the stretchable display panel device according to the present embodiment may include the stretchable display panel unit 310, the measurement unit 320, and the correction unit 330.

The stretchable display panel 310 is capable of being stretched in the first direction D1 and the second direction D2. In addition, the stretchable display panel 310 may also have a negative effective Poisson's ratio. However, the stretchable display panel 310 according to the present embodiment may be partitioned into a plurality of regions according to the strain ratio.

Figure 12:
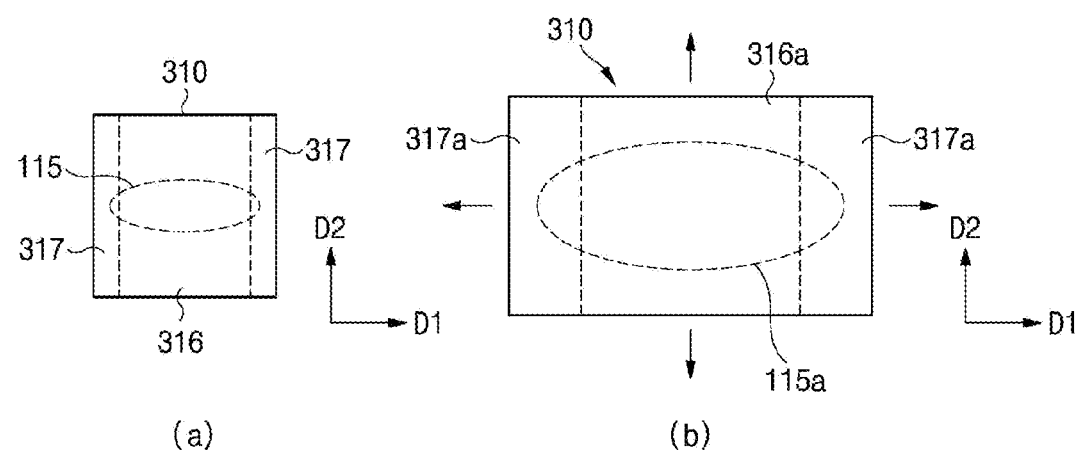
FIG. 12 is a view illustrating an example in which a stretchable display panel unit of the stretchable display panel device according to the second embodiment of the present disclosure.

FIG. 12 is a view illustrating an example in which the stretchable display panel unit 310 of the stretchable display panel device according to the second embodiment of the present disclosure.

As illustrated in FIG. 12, the stretchable display panel 310 may include a first strain-ratio region 316 and a second-ratio region 317. However, the first strain-ratio region 316 overall has a uniform strain ratio, and the second strain-ratio region 317 overall has a uniform strain ratio. As a result, the description of the stretchable display panel unit 110 according to the first embodiment may apply in the same manner to each of the first strain-ratio region 316 and the second strain-ratio region 317. For this reason, the stretchable display panel 310 according to the present embodiment may be one stretchable display panel that is made up of a plurality of the stretchable display panel units according to the first embodiment.

As a result, the measurement unit 320 may measure the strain ratio in the first direction D1 of the stretchable display panel unit 310 for each of the first and second strain-ratio regions 316 and 317.

The correction unit 330 may correct the image based on the measured strain ratio in the first direction and the effective Poisson's ratio for each of the first and second strain-ratio regions 316 and 317.

Accordingly, when the stretchable display panel unit 310 expands from a state thereof in FIG. 12(a) to a state thereof in FIG. 12(b), the image 115 that is displayed on both the first strain-ratio region 316 and the second strain-ratio region 317 may be displayed as the image 115a on both a first strain-ratio region 316a and a second strain-ratio region 317a.

Figure 13:
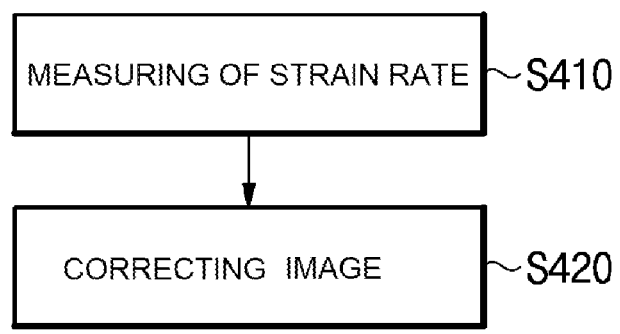
FIG. 13 is a flowchart illustrating a method of correcting an image on the stretchable display panel device according to the second embodiment of the present disclosure.

FIG. 13 is a flowchart illustrating the method of correcting an image on the stretchable display panel device according to the second embodiment of the present disclosure.

As illustrated in FIG. 13, the method of correcting an image on the stretchable display panel device according to the present embodiment may include a step S410 of measuring the strain ratio and a step S420 of correcting the image.

The step S410 of measuring the strain ratio may be a step of measuring the strain ratio in the first direction D1 for each of a plurality of regions into which the stretchable display panel 310 is partitioned according to the strain ratio and has a negative effective Poisson's ratio.

The step S420 of correcting the image may be a step of correcting the image on the basis of the measured strain ratio in the first direction D1 and the effective Poisson's ratio for each of the regions.

The embodiments of the present disclosure are described above in an exemplary manner. It would be understood by a person of ordinary skill in the art to which the present disclosure pertains that the embodiments of the present disclosure are readily modified into specific forms without changing the technical idea of the present disclosure and essential features thereof. Therefore, in every aspect, the embodiments described above should be understood as being exemplary and non-restrictive. For example, the constituent elements that are described as having their respective single forms may be implemented in a distributed manner, and likewise, the constituent elements that are described as being distributed may be implemented in a combined manner.

The scope of the present disclosure should be defined by the following claims, and all alterations or modifications that are derived from the construction and scope of the claims and from equivalents thereof should be interpreted as falling within the scope of the present disclosure.

INDUSTRIAL APPLICABILITY

The present disclosure may find application in the technical filed of stretchable display panels capable of effectively an image according to strain ratios.

The invention claimed is:

1. A stretchable display panel device comprising:
a stretchable display panel unit;
a measurement unit configured to measure a strain ratio of the stretchable display panel unit; and
a correction unit configured to correct an image on the stretchable display panel unit on the basis of the strain ratio,
wherein the stretchable display panel unit overall has a uniform strain ratio and has a negative effective Poisson's ratio,
wherein the strain ratio is a strain ratio in a first direction, and
wherein, in a case where a pixel number (I, J) of the stretchable display panel unit before stretched corresponds to a pixel number (i, j) after stretched and where the effective Poisson's ratio Nu satisfies the condition $-1 \leq Nu < 0$,
the correction unit computes the pixel number (i, j) using Equation 3, $$i = \text{Conversion for Integer Representation}\{I \times ((1-(S-1) \times Nu)/S)\}, j = J \quad \text{Equation 3:}$$

where S depicts a stretchability ratio in the first direction.

2. The stretchable display panel device of claim 1, wherein the measurement unit comprises:
a strain-ratio sensor; and
a Wheatstone bridge circuit configured to amplify a signal of the strain-ratio sensor.

3. The stretchable display panel device of claim 1, wherein the measurement unit comprises:
a digital image correlation (DIC) sensor.

4. The stretchable display panel device of claim 1, wherein the measurement unit comprises:
an electromagnetic meta-sensor.

5. A stretchable display panel device comprising:
a stretchable display panel unit;
a measurement unit configured to measure a strain ratio of the stretchable display panel unit; and
a correction unit configured to correct an image on the stretchable display panel unit on the basis of the strain ratio,
wherein the stretchable display panel unit overall has a uniform strain ratio and has a negative effective Poisson's ratio,
wherein the strain ratio is a strain ratio in a first direction, and
wherein, in a case where a pixel number (I, J) of the stretchable display panel unit before stretched corresponds to a pixel number (i, j) after stretched, and where the effective Poisson's ratio Nu is $Nu < -1$, the correction unit computes the pixel number (i, j) using Equation 4, $$i = I, j = \text{Conversion for Integer Representation}\{J \times (S/(1-(S-1) \times Nu))\} \quad \text{Equation 4:}$$

where S depicts a stretchability ratio in the first direction.

6. A stretchable display panel device comprising:
a stretchable display panel unit;
a measurement unit configured to measure a strain ratio of the stretchable display panel unit; and
a correction unit configured to correct an image on the stretchable display panel unit on the basis of the strain ratio,
wherein the stretchable display panel unit is partitioned into a plurality of regions according to the strain ratio thereof and has a negative effective Poisson's ratio,
wherein the measurement unit measures the strain ratio in a first direction of the stretchable display panel for each of the regions, and
wherein, in a case where a pixel number (I, J) of the stretchable display panel unit before stretched corresponds to a pixel number (i, j) after stretched and where the effective Poisson's ratio Nu satisfies the condition $-1 \leq Nu < 0$,
the correction unit computes the pixel number (i, j) using Equation 3, $$i = \text{Conversion for Integer Representation}\{I \times ((1-(S-1) \times Nu)/S)\}, j = J \quad \text{Equation 3:}$$

where S depicts a stretchability ratio in the first direction.

7. The stretchable display panel device of claim 6, wherein the measurement unit comprises:

a strain-ratio sensor; and a Wheatstone bridge circuit configured to amplify a signal of the strain-ratio sensor.

8. The stretchable display panel device of claim 6, wherein the measurement unit comprises:

a digital image correlation (DIC) sensor.

9. The stretchable display panel device of claim 6, wherein the measurement unit comprises:

an electromagnetic meta-sensor.

10. A stretchable display panel device comprising:

a stretchable display panel unit;

a measurement unit configured to measure a strain ratio of the stretchable display panel unit; and a correction unit configured to correct an image on the stretchable display panel unit on the basis of the strain ratio, wherein the stretchable display panel unit is partitioned into a plurality of regions according to the strain ratio thereof and has a negative effective Poisson's ratio, wherein the measurement unit measures the strain ratio in a first direction of the stretchable display panel for each of the regions, and wherein, in a case where a pixel number (I, J) of the stretchable display panel unit before stretched corresponds to a pixel number (i, j) after stretched, and where the effective Poisson's ratio Nu is Nu<−1, the correction unit computes the pixel number (i, j) using Equation 4, $$i=I, j=\text{Conversion for Integer Representation}\{J\times(S/(1-(S-1)\times Nu))\} \quad \text{Equation 4:}$$

where S depicts a stretchability ratio in the first direction.

* * * * *